Feb. 16, 1971 E. W. BOTTUM 3,563,053
SUCTION ACCUMULATOR
Filed Sept. 16, 1968 3 Sheets-Sheet 1

INVENTOR
EDWARD W. BOTTUM

BY Whittemore, Hulbert
& Belknap ATTORNEYS

Feb. 16, 1971 E. W. BOTTUM 3,563,053
SUCTION ACCUMULATOR
Filed Sept. 16, 1968 3 Sheets-Sheet 2

INVENTOR
EDWARD W. BOTTUM

BY Whittemore, Hulbert & Belknap
ATTORNEYS

Feb. 16, 1971   E. W. BOTTUM   3,563,053
SUCTION ACCUMULATOR

Filed Sept. 16, 1968   3 Sheets-Sheet 3

INVENTOR
EDWARD W. BOTTUM

BY Whittemore, Hulbert
& Belknap ATTORNEY

United States Patent Office 3,563,053
Patented Feb. 16, 1971

3,563,053
SUCTION ACCUMULATOR
Edward W. Bottum, 9357 Spencer,
Brighton, Mich. 48116
Filed Sept. 16, 1968, Ser. No. 759,863
Int. Cl. F25b *43/00*
U.S. Cl. 62—503                16 Claims

ABSTRACT OF THE DISCLOSURE

The suction accumulator of the invention is designed for use with the suction or compressor side of a refrigeration system. The accumulator comprises a casing having an inlet and an outlet. A conduit is provided within the casing. The conduit extends from a point adjacent the bottom of the casing to the casing outlet and acts as a suction tube to draw liquid from the casing and expel it into the casing outlet at a metered rate. The conduit is preferably a generally U-shaped tube which has a first leg connected to and extending from the outlet towards the lower portion of the casing and a second leg extending from the first leg towards the upper portion of the casing and terminating in an open end for the passage of gas therethrough. The U-shaped tube has an opening adjacent the lower portion of the casing to draw liquid from the casing and expel it into the casing outlet at a metered rate.

A liquid trap chamber is connected to the outlet to receive excessive amounts of liquid expelled from the conduit. The liquid trap chamber may be connected either exteriorly of the casing or interiorly thereof between the conduit and the outlet. The inlet to the casing comprises a tube which extends into the casing through a side wall or top wall thereof. The inlet tube preferably has a wall portion on the inner end thereof bent inwardly with an edge portion thereof severed from the conduit to form an opening and cooperating guide surface for directing incoming fluid at substantially a right angle to the longitudinal axis of the inlet conduit to thereby direct the incoming fluid in a manner to reduce turbulence within the casing. Valve means may be provided to cause discontinuance of fluid flow from the casing through the casing outlet when the level of liquid reaches a predetermined point.

BACKGROUND OF THE INVENTION

The suction accumulator of the type to which the present invention relates is provided in a refrigeration system between the suction side of the system and the evaporator side. The function of the accumulator is to pass gaseous refrigerant on to the compressor of the system but to trap liquid refrigerant when this liquid is present in excessive amounts. The liquid refrigerant is retained within the accumulator and metered to the compressor at a controlled rate. This protects the compressor against shock resulting from the sudden injection into the compressor of large amounts of liquid refrigerant. Large amounts of liquid refrigerant may result in damage to the compressor or associated components.

The present invention provides an additional safety factor over and above the usual protection offered by a suction accumulator. Suction accumulators work well under normal operating conditions. However, it sometimes happens that an extremely large amount of liquid refrigerant will be present within the accumulator. Such accumulators have suction tubes which draw the gaseous and liquid refrigerant from the accumulator and deliver this fluid to the accumulator outlet. When the suction tube becomes filled with liquid refrigerant, such as may happen when the refrigeration system is shut down and then restarted, the slug of liquid material within the suction tube is injected into the outlet of the accumulator. This slug may cause damage to the compressor or associated components.

The present invention relieves this problem by providing a trap chamber in association with the accumulator outlet. The trap chamber is of sufficient capacity to receive all of the liquid within the suction tube while still permitting gas to be exhausted through the outlet.

A valve structure is provided for those instances where the trap chamber is not sufficient in capacity to handle all of the liquid refrigerant which may be injected thereinto. A further refinement of the invention is the provision of an inlet tube of low-cost construction which directs the stream of incoming fluid in a manner to prevent turbulence occurring within the accumulator.

SUMMARY OF THE INVENTION

A suction accumulator is provided for the inlet of a compressor of a refrigeration system. The accumulator comprises a casing having an inlet and an outlet. A conduit within the casing extends from a point adjacent the bottom of the casing to the casing outlet. This conduit acts as a passageway for gaseous refrigerant and as a suction tube to draw liquid refrigerant from the casing and expel it into the casing outlet at a metered rate. The present invention comprises an improvement over standard suction accumulators in that a liquid trap chamber is connected to the outlet to receive excessive amounts of liquid expelled from the conduit. Additionally, valve means are provided for extreme conditions when the capacity of the trap chamber is not sufficient to handle the liquid refrigerant present in the accumulator. Further, the inlet is designed to prevent turbulence within the accumulator caused by incoming fluid refrigerant.

DESCRIPTION OF THE PREFERRED EMBODIMENTS

Figures 1, 5:
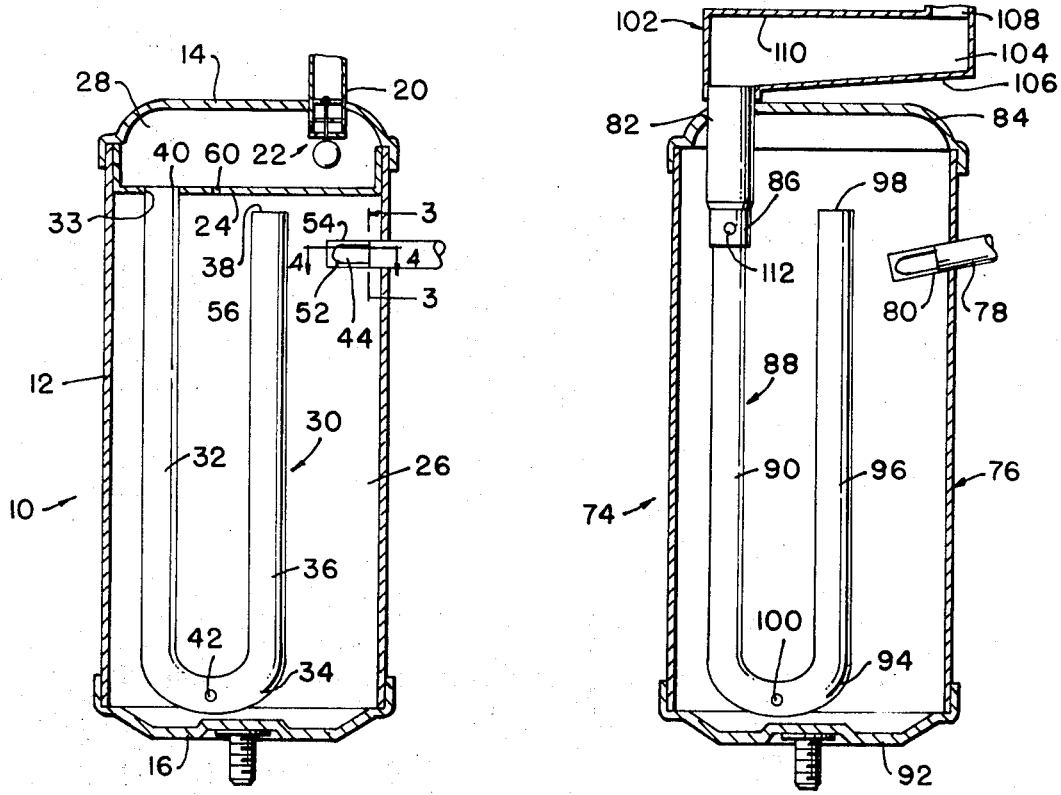
FIG. 1 is a side elevational view in scetion of one embodiment of the suction accumulator of the present invention.
FIG. 5 is a sectional view in elevation of another embodiment of the suction accumulator illustrating an external liquid trap provided at the outlet of the accumulator.
Figure 2:
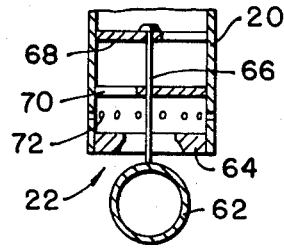
FIG. 2 is an enlarged view of the valve mechanism located in the upper portion of the accumulator of FIG. 1.

Referring to FIGS. 1 and 2, the suction accumulator 10 includes a casing which comprises an open ended tube 12 having an upper end closure 14 and a lower end closure 16 secured thereto.

An inlet tube 18 extends through the side wall of the tube 12 adjacent the upper end of the tube. An outlet tube 20 extends through the upper end closure 14. The outlet tube 20 terminates in the uuper portion of the casing. A float valve structure 22 is provided on the interior end of the tube 20.

A cup-shaped partition 24 is provided within the tube 12 adjacent the upper end thereof. The partition 24 defines a primary trap chamber 26 comprising most of the lower portion of the casing and a secondary trap chamber 28 in the upper portion of the casing which is of considerably less volume than the primary trap chamber 26.

A U-tube 30 is provided within the casing to effectuate fluid communication between the chambers 26, 28. One leg 32 of the tube 30 extends from the partition 24 downwardly to a point adjacent the lower end closure 16. The tube is then provided with a bend 34 and the second leg 36 extends upwardly and terminates in an open end 38 adjacent to the partition 24. The open end 40 of the leg 32 is seated in an opening 33 in the partition 24 whereby the tube 30 provides fluid communication between the chambers 26, 28. A small metering opening 42 is provided in the tube bend 34 for the passage of metered amounts of liquid refrigerant from the chamber 26 into the tube 30.

Figure 3:
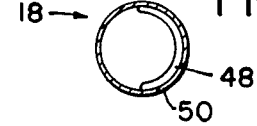
FIG. 3 is a sectional view taken substantially along the line 3—3 of FIG. 1 looking in the direction of the arrows.
Figure 4:
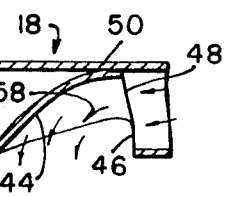
FIG. 4 is a sectional view taken substantially along the line 4—4 of FIG. 1 looking in the direction of the arrows.

Referring to FIGS. 1, 3 and 4, it will be noted that the inlet tube 18 extends for a short distance into the casing. One wall portion 44 is deformed inwardly into the tube to form a scoop for directing the flow of incoming fluid into the casing. The tube 18 is slit at 46 for approximately half the circumference of the tube. The wall portion 44 is then deformed inwardly in the general shape of a curved scoop with the marginal edge 48 engaging the inner surface of the wall portion 50. The edges 52, 54 of the wall portion 44 converge at the inner end 56 of the tube and define a generally V-shaped section. As indicated by the arrows 58 in FIG. 4, incoming fluid impinges against the wall portion 44 and is directed in a curved path to exit from the tube at approximately right angles to the longitudinal axis of the tube and generally tangentially to the inner surface of the casing tube 12.

In operation of the accumulator, cool refrigerant gas having a small amount of entrained liquid refrigerant therein enters the accumulator through the inlet tube 18. The incoming gases, which move at a relatively high velocity, are directed tangentially against the interior wall of the casing and follow a circular path around the casing interior. The gases are then free to expand with resultant reduction of the velocity thereof. As a consequence, incoming gases are not directed as a high speed jet against any liquid which may be retained in the lower portion of the casing. This prevents turbulence of the liquid which may result in objectionable foaming and also prevents splashing of liquid into the open end 38 of the U-shaped tube 30. The introduction of liquid into the U-shaped tube by splashing is undesirable because it is desired to control the rate at which liquid enters the U-shaped tube.

An additional advantage of directing the incoming gases tangentially against the interior surface of the casing is that entrained liquids in the gas will be centrifugally separated from the gas. As will be appreciated, the entrained liquids are heavier than the gas and are thrown against the surface of the casing and deposited thereon for eventual flow towards the bottom of the casing.

Another feature of the inlet which will be noted is that there is no need to control the passage of refrigerant gases into the casing through the inlet tube 18 by means of a restriction. The use of a restriction would result in the pressure of the incoming gases being reduced. The present inlet permits incoming refrigerant gases to freely pass into the casing without a pressure drop. If there were a pressure drop, energy would be lost, thus decreasing the efficiency of the system and requiring the compressor to work harder to draw refrigerant from the accumulator.

The physical construction of the inlet tube 18 possesses certain practical advantages when compared, for example, to an inlet tube which has the inlet end curved to match the curvature of the interior surface of the casing and aimed to eject gases in the same manner as the present inlet tube. The mechanical process of bending of the inner end of such a tube is expensive as compared with the stamping process involved in fabricating the tube 18. Additionally, the tube 18 is advantageous in that it is easily mounted and assembled onto the accumulator. This results from the fact that at no point is the diameter of the tube 18 enlarged nor out of round.

The refrigerant gases which enter the casing are drawn into the open end 38 of the U-tube 30, pass through both legs of the U-tube and exit into the chamber 28. The gases are extracted from the chamber 28 via the outlet tube 20 and thence to the compressor of the system (not shown). The compressor, which creates a suction, draws the gaseous refrigerant through the accumulator at a relatively rapid rate.

Liquid refrigerant which enters the accumulator through the inlet tube 18 drops to the bottom of the accumulator and is subsequently drawn through the opening 42 and then through the leg 32 into the chamber 28. It will be appreciated that the liquid which is metered into the leg 32 is entrained in the stream of gaseous refrigerant. It remains entrained in the gas within the chamber 28 and is drawn through the outlet tube 20 and thence to the compressor of the system. The opening 42 acts as a restriction and causes liquid refrigerant to be metered into the compressor at a controlled rate. The accumulator thus acts to prevent large amounts of liquid refrigerant from suddenly entering the compressor. Such sudden surges of liquid may result in seriously damaging the compressor.

During operation of the refrigeration system, there are times when an unusual amount of liquid refrigerant will collect in the accumulator. For example, when the system is shut off, such as is the case with an intermittently operated air conditioning system, the refrigerant tends to condense in the entire system and collects in the accumulator. A similar situation may occur when the system is operated under low load conditions. Further, in extreme overload or flood-back conditions, an unusual amount of liquid refrigerant may be present in the system. At such times, the level of refrigerant may rise considerably above the bend 34 of the U-tube. There will then be a relatively large quantity of refrigerant within the legs of the U-tube. It is undesirable to deliver this liquid as a single slug to the compressor because this may cause compressor damage such as broken valves, pistons, connecting rods, crank shaft, blown gaskets or bearing failure. Additionally, such liquid may result in dilution of the oil, liquid wash-out of the bearings or complete loss of oil from the crank case.

The liquid trap chamber 28 is provided to prevent sending slugs of liquid refrigerant into the compressor. If the U-tube 30 becomes filled with liquid refrigerant, the pressure within the casing resulting from incoming refrigerant gas through the inlet tube 18 will cause the head of liquid to be injected into the chamber 28. The chamber 28 is of sufficient volume to receive the entire contents of the U-tube 30 without being filled. The maximum level which may be caused by injecting the contents of the tube 30 into the chamber 28 is beneath the lower end of the outlet tube 20.

After the initial slug of liquid refrigerant has been injected into the chamber 28, refrigerant gas flows through the U-tube in the usual manner. This gas, upon entering into the chamber 28, will bubble through the liquid refrigerant therein and thence pass into the outlet tube 20 for transmission to the compressor of the system. Eventually, the liquid contents of the primary trap chamber 26 will be metered through the opening 42 to bring the operation of the accumulator back to normal.

A small opening 60 is provided in the partition 24 to permit liquid within the chamber 28 to drain back into the chamber 26. Liquid which drains into the chamber 26 is, of course, eventually entrained in the gaseous refrigerant passing through the U-tube 30 and forwarded to the compressor in the usual manner. The pressure conditions in the chambers 26, 28 may be such as to prevent liquid from draining through the opening 60 during operation of the refrigeration system. It will be appreciated that the pressure in chamber 28 is lower than the pressure in the chamber 26 because the outlet tube 20 is connected to the low-pressure compressor while the inlet tube 18 is connected to the relatively high-pressure evaporator side of the system. However, if some refrigerant is retained within the trap chamber 28 during operation of the system, this will not affect the efficiency of the system because of the small amount of refrigerant involved. When the refrigeration system is turned off, or during the "off" cycle, any liquid in the chamber 28 will drain back into the chamber 26.

The valve structure 22 is provided in the outlet tube 20 to prevent passage of liquid through the tube 20 when the level of liquid in the chamber 28 exceeds a predetermined amount. Closure of the valve structure 22 will result in virtual shut-off of the entire system. This shut-off feature is designed for extreme overload conditions wherein liquid refrigerant may flood the accumulator 10. At such times, it is desired that the system be shut down rather than risk serious damage to the compressor and other components on the compressor side.

As will be noted in FIG. 2, the valve structure 22 comprises a valve element 62 which is in the shape of a hollow ball. A valve seat 64 is provided in the lower end of the tube 20. A guide rod 66 extends from the valve element 62 into the tube 20. A pair of guide spiders 68, 70 are provided in spaced-apart relationship within the tube 20 to guide the rod and thereby the valve element 62 in a predetermined up and down path. As will be appreciated, when the liquid level in the chamber 28 rises sufficiently, it will contact the valve element 62 and cause this element to ride upwardly until it eventually seats on the valve seat 64, thus substantially closing the outlet tube 20.

A plurality of small, spaced-apart openings 72 are provided in the wall of the outlet tube 20 just above the valve seat 64. These openings will permit a small metered amount of either liquid or gaseous refrigerant to bypass the valve element 62 when this element is seated. This configuration results in eventual self-starting of the refrigeration system because the level of refrigerant is gradually reduced by the flow of metered amounts of refrigrant into the outlet tube 20 via the openings 72. Liquid or gas which is injected into the outlet tube 20 will, of course, be drawn into the compressor by suction created by the compressor. When the liquid level in the chamber 28 falls below the level of the openings 72, refrigerant gas flows through the openings. The gas will entrain liquid refrigerant to thereby reduce the level of the refrigerant in the chamber 28. Eventually, the level will fall to a point where the valve element 62 will drop whereupon normal operation of the system will be resumed. Of course, if the overload flooding condition continues, the level will not fall and the valve will remain closed.

As an alternate to the automatic restart feature provided by the metering openings 72, the valve element 62 may be depressed by disengaging fittings and inserting a depressor into the tube 20 from a point thereabove. Another method of restarting the system is to drain the accumulator 12. Such manual methods for restart would, of course, only be employed at such time as the circumstances creating the overload condition have been rectified. Another advantage of this construction is that the entire valve assembly 22 may be removed for repair without disassembly of the entire unit. Normally, if interior repair of an accumulator is necessary, the unit is discarded because of the cost of repair.

FIG. 5 illustrates an embodiment similar in many respects to that shown in FIG. 1. In FIG. 5, the accumulator 74 comprises a casing 76 of the construction previously illustrated. An inlet tube 78 of the type utilized in the FIG. 1 embodiment extends through the casing wall into the casing interior adjacent the upper portion of the casing. It will be noted that the inlet tube 78 is angled downwardly so that the outlet 80 directs the stream of refrigerant at a slightly downwardly inclined angle to thereby provide for a downward helical spiral of the gas stream. This is advantageous in that it prevents undue turbulence of the refrigerant gases in the upper portion of the casing which turbulence results in a reduction of the energy level of the incoming gases.

An outlet tube 82 extends through the upper end closure 84. The inner end 86 of the tube 82 is of reduced diameter and receives one end of a U-tube 88. One leg 90 of the tube 88 extends from the outlet tube 82 downwardly to a point adjacent the lower end closure 92. The tube is then provided with a bend 94 and the second leg 96 extends upwardly and terminates in an open end 98 adjacent the upper end closure 84. A small metering opening 100 is provided in the tube bend 94.

A casing 102 is provided on the exterior end of the outlet tube 82. The interior of the casing 102 defines a trap chamber 104. It will be noted that the casing 102 extends laterally from the outlet tube 82 and has an upwardly inclined bottom wall 106. A tube 108 extends from the upper wall 110 and is connected to the compressor of the refrigeration system.

In operation of the accumulator, refrigerant gas enters the accumulator through the inlet tube 78. Any liquid refrigerant contained therein will drop to the bottom of the casing 76 and eventually be metered through the opening 100 provided in the U-tube 88. As previously described, in the event of an excess amount of liquid refrigerant being present in the casing 76 so as to fill the U-tube 88, the slug of liquid refrigerant in the U-tube will be injected into the trap chamber 104. The gaseous refrigerant will rise above the level of the liquid refrigerant in chamber 104 and be expelled through the outlet tube 108 to the compressor. The slant or slope of the bottom wall 106 provides for run-back of the liquid refrigerant into the U-tube. Eventually, the liquid refrigerant will be metered into the outlet 108 by entrainment thereof in the stream of gaseous refrigerant to ultimately relieve the condition of excess liquid refrigerant in the accumulator without suddenly sending a slug of liquid material into the compressor structure.

It will be noted that a small orifice 112 is provided in the leg 90 of the U-tube 88 at approximately the same level as the open end 98 of the leg 96. The orifice 112 operates to equalize pressure in both legs of the U-tube, thereby preventing the flow of quantities of liquid into the suction line during the inactive period of the refrigeration cycle.

Figure 6:
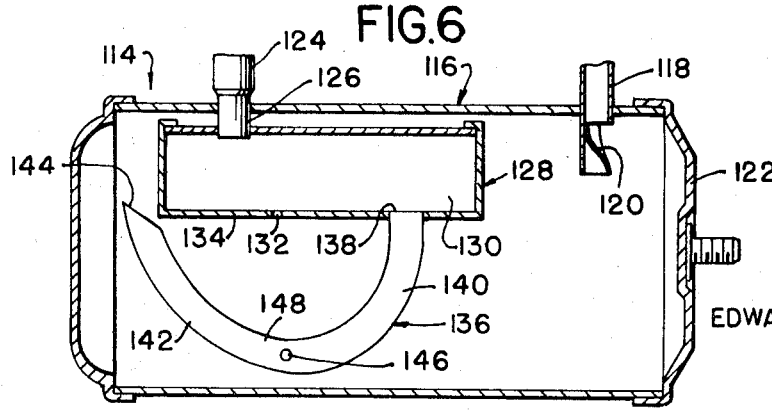
FIG. 6 is a sectional view of another embodiment of the accumulator illustrating the accumulator positioned along its horizontal axis.

FIG. 6 illustrates an embodiment of the invention wherein the accumulator 114 is positioned with the longitudinal axis thereof in the horizontal plane. In the FIG. 6 embodiment, the accumulator comprises a casing 116 of the type previously described. An inlet tube 118 is provided at one end of the casing and extends through the side wall of the casing. The inlet tube has a scoop-type outlet 120 of the type previously described in connection with the inlet tubes of FIGS. 1 and 5, so as to direct the stream of incoming fluid material towards the end closure 122 rather than directly towards the bottom of the casing to thereby prevent splashing and turbulence of any liquid material present within the casing.

An outlet tube 124 is provided at the opposite end of the casing and also extends through the side wall of the casing. The inner end 126 of the outlet tube is of reduced diameter. A generally box-like casing 128 is provided within the accumulator casing 116. The interior space 130 of the casing 128 serves as a trap chamber for liquid refrigerant. A drainage opening 132 is provided in the bottom wall 134 of the casing 128. A U-tube 136 is attached to the bottom wall of the casing. The outlet 138 of one leg 140 communicates with the trap chamber 130. The other leg 142 terminates in an open end 144. A metering opening 146 is provided in the bend 148 of the U-tube.

In operation of the accumulator 114, gaseous refrigerant having some liquid refrigerant entrained therein enters the casing 116 via the inlet tube 118. Any excessive amount of liquid which enters the inlet tube 118 falls to the bottom of the casing and forms a pool of liquid which is eventually metered into the U-tube via the metering opening 146. The gaseous refrigerant enters the U-tube via the open end 144 and passes through the U-tube into the trap chamber 130. The gaseous refrigerant then leaves the trap chamber via the outlet tube 124 for eventual delivery to the compressor of the system. In the event of an unusual amount of liquid refrigerant being present in the casing 128 and thus in the U-tube 136, the slug of liquid refrigerant is injected into the trap chamber but does not flow through the outlet tube 124. The liquid refrigerant in trap chamber 130 eventually drips back into the casing 116 via the drainage opening 132 in the bottom wall 134 and is ultimately metered back into the system via the metering opening 146.

Figure 7:
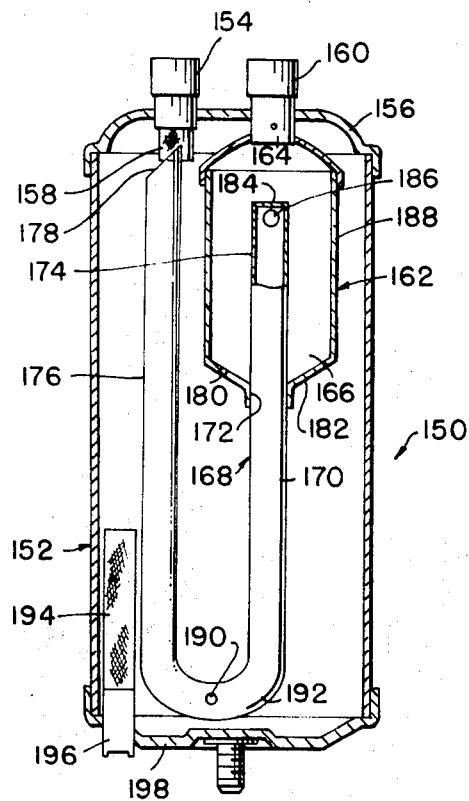
FIG. 7 is a side elevational view in section of another embodiment of the accumulator illustrating an internal trap positioned around the outlet within the accumulator.
Figure 8:
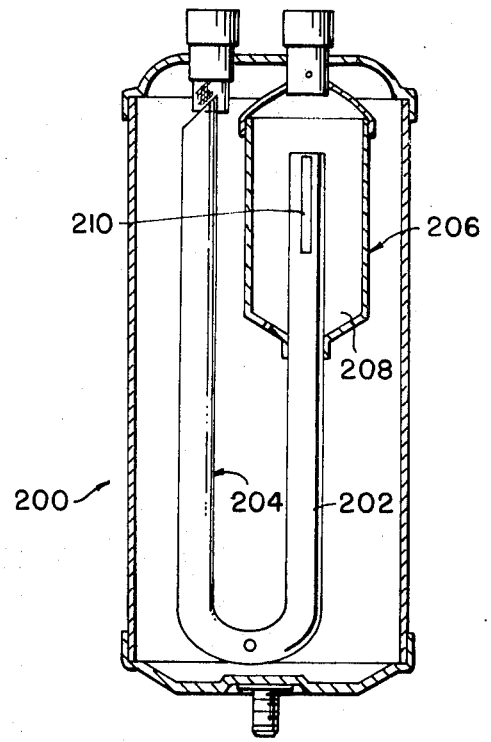
FIG. 8 is a side elevational view of an embodiment similar to FIG. 7, but wherein the outlet into the trap is configured to provide a non-agitative flow into the accumulator.

FIGS. 7 and 8 illustrate accumulator structures of the vertical type wherein the trap chamber is provided internally of the accumulator casing. Referring first to FIG. 7, it will be noted that the accumulator 150 includes the usual casing 152 which is oriented with the longitudinal axis thereof in the vertical plane. An inlet tube 154 extends through the upper end closure 156. A screen 158 is provided on the interior end of the inlet tube 154. The screen 158 functions to disperse the incoming stream of gaseous refrigerant so as to avoid turbulence of any liquid refrigerant in the lower portion of the casing 152. Additionally, the screen acts to catch any foreign particles which may be entrained in the stream of gaseous refrigerant.

An outlet tube 160 is also provided in the upper end closure 156. A cylindrical casing 162 is carried on the interior end 164 of the outlet tube 160 with the outlet 160 communicating with the interior trap chamber 166. A U-tube 168 of the usual construction is provided within the accumulator casing 152. One leg 170 of the U-tube extends through an opening 172 in the lower end of the casing 162. A portion 174 of the leg 170 extends interiorly of the chamber 166 to a point somewhat above the mid-portion thereof. The other leg 176 of the U-tube extends upwardly and terminates in an open end 178 which is approximately at the same level as the upper portion of the casing 162. A drain opening 180 is provided in the lower wall 182 of the casing 162. It will be noted that the upper end of the leg 170 is enclosed by a wall portion 184. An opening 186 is provided in the side wall of the leg 170 immediately beneath the wall portion 184. The opening 186 directs the stream of gaseous material laterally against the side wall 188 of the casing 162.

It will be noted that the usual metering opening 190 is provided in the bend 192 of the U-tube 168.

In operation of the accumulator 150, incoming gaseous refrigerant is received through the inlet tube 154. This incoming material is dispersed into a mist-like formation by the screen 158. Entrained liquid contained within the gaseous stream falls to the bottom of the casing 152 and is eventually metered through the opening 190. Gaseous refrigerant is drawn through the open end 178 of the leg 176 and passes into the trap chamber 166 via the opening 186 in the leg 170. This material is sprayed against the side wall 188 of the casing 162 to thus reduce the turbulence of the liquid within the casing. If there is an excess of liquid within the accumulator so that the legs of the U-tube 168 have a substantial amount of liquid material therein, the liquid is ejected into the casing 162 and falls to the bottom thereof. The portion 174 of the leg 170 extends for a sufficient distance above the lower portion of the casing 162 with the result that the gaseous refrigerant which exits from the opening 186 does not normally travel through the entire pool of liquid refrigerant which may be present within the casing. This avoids turbulence and frothing of the refrigerant within this casing. The liquid refrigerant in the casing 162 eventually drains back into the main casing 152 through the drain opening 180. Ultimately, the major portion of liquid refrigerant within the casing 152 is drawn through the metering opening 190 and entrained in the gaseous stream for eventual expulsion from the accumulator. The gaseous material within the casing 162 is, of course, drawn through the outlet tube 160 and passed to the compressor structure of the system.

An additional feature of the FIG. 7 embodiment is the provision of a desiccant material therewithin to dry the refrigerant. It will be noted that a screen 194 is provided in the lower portion of the accumulator casing 152. A removable mounting structure 196 extends through an opening in the lower end closure 198, permitting removal of the screen casing 194 for renewal of the desiccant. Desiccant material is contained within the screen casing 194.

FIG. 8 illustrates an accumulator 200 which in most respects is identical with that shown in FIG. 7. In the FIG. 8 embodiment, the leg 202 of the U-tube 204 has the upper portion thereof extending into a casing 206 which defines a trap chamber 208. The difference between the FIG. 8 and FIG. 7 embodiments is the configuration of the outlet opening 210 provided in the upper portion of the leg 202. It will be noted that the opening 210 has an elongated slit-like configuration. This configuration provides for ejecting gaseous refrigerant from the U-tube in a fan-like pattern at high velocity, thereby breaking up any liquid into small particles which will be entrained in the gas and be drawn into the outlet therewith.

Figures 9, 10:
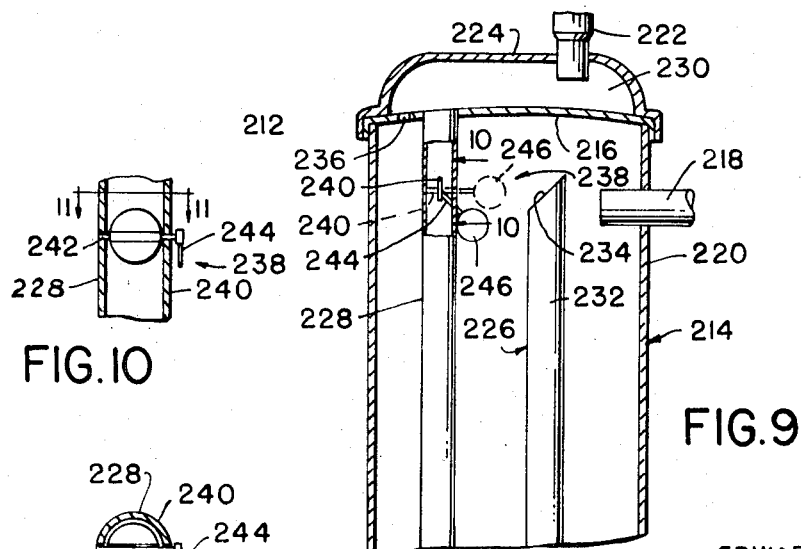
FIG. 9 is a side elevational view of the upper portion of an accumulator illustrating an embodiment wherein flow from the accumulator is controlled by means of a valve structure provided in the outlet.
FIG. 10 is a view in section of the valve taken substantially along the line 10—10 of FIG. 9, looking in the direction of the arrows.
Figure 11:
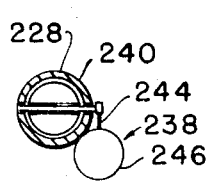
FIG. 11 is a sectional view of the valve structure taken substantially along the line 11—11 of FIG. 9, looking in the direction of the arrows.

FIGS. 9, 10 and 11 illustrate an embodiment which, in many respects, is similar to that in FIG. 1. The accumulator 212 comprises a casing 214 having a partition 216 across the upper end thereof. An inlet tube 218 extends through the side wall 220 adjacent the underside of the partition 216. An outlet tube 222 extends from the upper end closure 224. A U-tube 226 has one leg 228 which extends from the partition 216, the open end thereof communicating with the chamber 230. The other leg 232 of the U-tube extends upwardly parallel to the leg 228 and terminates in an open end 234.

It will be noted that the parition 216 curves upwardly and that a drainage opening 236 is provided therewithin. The upward curvature of the partition results in a stronger structural element and also assists in causing liquid within the chamber 230 to flow towards the drainage opening 236.

A float valve construction 238 is provided on the upper portion of the leg 228. The float valve construction comprises a disk-like valve element 240 which is located within the leg 228. The value element 240 is mounted on a rod 242 for pivotal movement. The rod is suitably journaled in the side walls of the leg 228. A portion of the rod extends outwardly from the leg 228, and arm 244 is attached thereto. The arm 244 carries, at its outer end, a float 246. The float 246, as shown in FIG. 9, normally falls to a downwardly inclined position wherein the valve element 240 is oriented substantially vertically so that liquid and gas can pass thereby.

In normal operation of the accumulator 212, gaseous refrigerant enters, in the usual manner, through the inlet tube 218 and is drawn through the open end 234 of the leg 232 and thence to the leg 228 into the chamber 230 from whence it is exhausted through the outlet tube 222 to the compressor structure. If liquid refrigerant is contained within the U-tupe 226 upon start-up of the system, this liquid is injected into the chamber 230 without being drawn into the outlet tube 222.

In the event that an unusual amount of liquid refrigerant fills the casing 214 up to the level of the float 246, the float 246 is raised to the dotted-line position shown in FIG. 9. When raised to this position, the valve element 240 is pivoted to the dotted-line position of FIG. 9 to thereby close the leg 228 to the flow of fluid. This effectively turns the refrigeration system off until the level of liquid within the casing 214 subsides. The valve element 240 is of slightly less diameter than the diameter of the leg 228 to provide for leakage thereby so that the excess liquid may be gradually expelled thus allowing for automatic restart of the system.

Thus, the valve structure 238 acts as a safeguard against a large amount of liquid being passed through the outlet tube 222 to cause damage to the compressor components. This could happen if the casing 214 continued to receive excess amounts of liquid which would eventually fill the trap chamber 230 and be drawn through the outlet tube 222.

Figure 12:
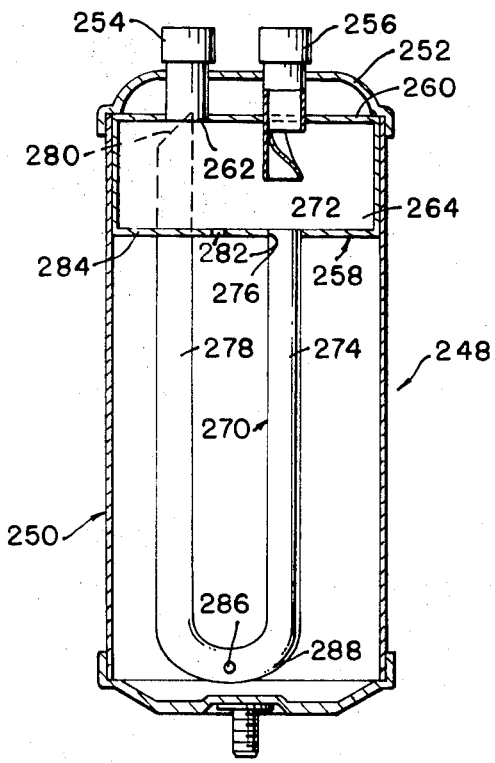
FIG. 12 is a side elevational view in section of a further embodiment of the suction accumulator wherein both the inlet and outlet to the accumulator communicate with the trap.

FIG. 12 illustrates an accumulator 248 which operates on a similar concept to those previously described. The accumulator comprises the usual casing 250 having an upper end closure 252 through which projects an outlet tube 254 and an inlet tube 256. An inner casing 258 is provided within the casing 250 adjacent the upper end thereof. The outlet tube 254 extends into an opening 262 in the upper wall 260 of the casing and communicates with the interior chamber 264 thereof. The inlet tube 256 is positioned in front of the casing 258. A U-tube 270 is provided within the casing 250. The upper end 272 of one leg 274 is seated in an opening 276 provided in the lower casing wall 284. The other leg 278 of the U-tube extends upwardly and terminates in an open end 280 behind the inner casing 258. A drainage opening 282 is provided in the bottom wall 284 of the inner casing 258. The usual metering opening 286 is provided in the bend 288 of the U-tube.

In operation of the FIG. 12 embodiment, gaseous refrigerant enters the casing 250 through the inlet tube 256. The gaseous refrigerant, along with any entrained liquid, flows against the side wall of casing 250, the liquid falling to the bottom. This gaseous refrigerant is subsequently drawn through the open end 280 of the leg 278, passes through the leg 278 and thence through the leg 274 into the chamber 264. The fluid material entering the chamber 264 is directed against the wall portion 260. Any excessive amount of liquid splashes from the wall 260 and is directed towards the opening 282. The liquid material is then ultimately either drained back through the opening 282 into the casing 250 or absorbed in the gas stream and passed into the outlet 254.

Figure 13:
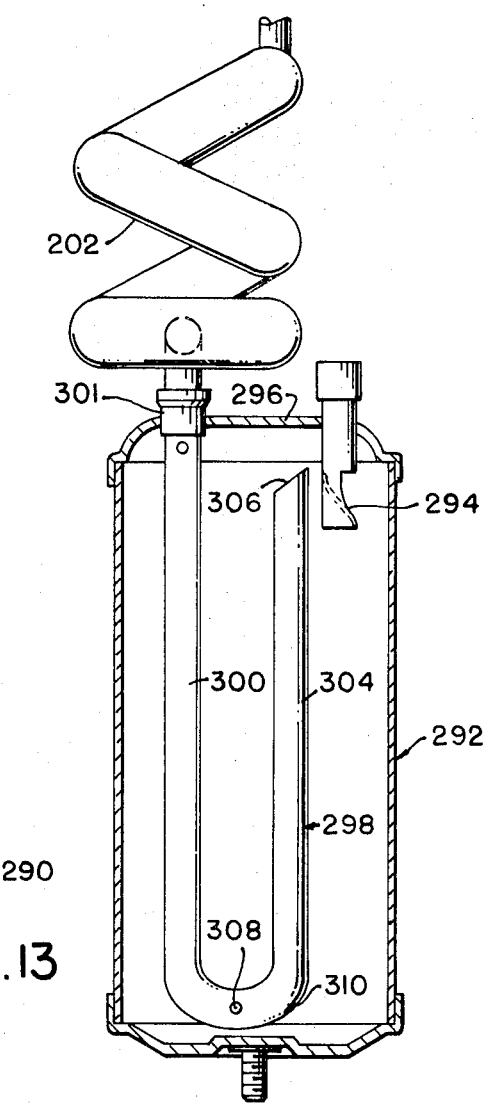
FIG. 13 is a side elevational view in section of a further embodiment of the suction accumulator wherein an external trap in the form of spiral tubing is provided at the outlet of the accumulator.

FIG. 13 illustrates an accumulator which is similar in concept and function to that illustrated in FIG. 5. In FIG. 13, the accumulator 290 comprises the usual casing 292 having an inlet tube 294 extending through the upper end closure 296. A U-tube 298 is provided within the casing 292. One leg 300 is connected to the outlet 301 which extends through the upper end closure 296. The outlet 301 is connected to a helical, tubular member 202. The other leg 304 of the U-tube extends upwardly parallel with the leg 300 and terminates in an open end 306. The usual metering opening 308 is provided in the bend 310 of the U-tube.

In operation of the FIG. 13 embodiment, gaseous refrigerant enters the accumulator 290, 292 through the inlet tube 294 and is drawn through the open end 306 of the leg 304 through the U-tube and thence through the outlet 301 into the tubular, helical member 302. The member 302 is eventually connected to the compressor structure of the refrigeration system via a conduit 303. In the event of an excess amount of liquid refrigerant being present within the U-tube 298, the slug of liquid refrigerant is ejected into the helical, tubular member 302. The member 302 is of considerable larger diameter than the diameter of the U-tube. Consequently, it receives the liquid refrigerant while still not being filled. Gaseous refrigerant may pass thereby without carrying with it the liquid contents of the tube. The slant of the coils of the member 302 causes the liquid to tend to flow back into the U-tube so that it does not become permanently trapped therewithin. Eventually, the liquid is dispersed by entrainment in the gaseous stream so that the device operates in a normal manner.

What I claim as my invention is:

1. In a suction accumulator for the compressor of a refrigeration system, said accumulator comprising a casing having an inlet and an outlet, a conduit within the casing having an open end adjacent the upper portion of the casing and having a portion extending from said open end to a point adjacent the bottom of the casing and thence to the casing outlet, said conduit having a metering opening adjacent the bottom of the casing, said conduit acting to draw gas through said open end thereof and draw liquid at a controlled rate through said metering opening therein and expel both the gas and the liquid into the casing outlet, the improvement comprising a liquid trap chamber connected to the outlet at a point therebelow to receive and hold excessive amounts of liquid expelled from said conduit, said trap chamber having a sufficient volume to receive any liquid which may be present at a given time in the conduit and still permit gas to pass through the outlet.

2. A suction accumulator as defined in claim 1, and further characterized in that said liquid trap chamber is provided between said conduit and said casing outlet.

3. A suction accumulator as defined in claim 1, and further characterized in that drainage means are provided in said liquid trap chamber in communication with said casing for the flow of liquid from the trap chamber back into the casing.

4. A suction accumulator as defined in claim 1, and further characterized in the provision of valve means operative to stop flow of liquid through said conduit when the level of liquid within the casing reaches a predetermined point.

5. A suction accumulator as defined in claim 5, and further characterized in that said valve means comprises a float valve structure including a valve element within said conduit, a float in said casing exteriorly of said conduit, and an actuator connecting said float to said valve element for closing the conduit upon movement of the float by a rising liquid level.

6. A suction accumulator as defined in claim 1, and further characterized in the provision of valve means in said trap chamber to stop flow through said casing outlet when the level of liquid within the trap chamber reaches a predetermined point.

7. A suction accumulator as defined in claim 6, and further characterized in that said trap chamber is connected between the conduit and the casing outlet, said valve means comprising a float valve structure provided in the outlet.

8. A suction accumulator as defined in claim 6, and further characterized in that said valve means comprises a float valve structure in the casing outlet, and bypass means upstream of said float valve structure to permit a metered amount of fluid to flow into the outlet when the valve is closed.

9. A suction accumulator as defined in claim 1, and further characterized in the provision of a dividing wall across the upper portion of the casing defining said liquid trap chamber in the upper portion of the casing, said conduit extending from said dividing wall and providing communication between the main portion of the casing and the liquid trap chamber, said casing outlet extending from said liquid trap chamber, and drainage means in said dividing wall.

10. A suction accumulator as defined in claim 1, and further characterized in the provision of an inner casing within said accumulator casing, said conduit and outlet communicating with said inner casing, and said inner casing having drainage means for the flow of liquid therefrom back into the accumulator casing.

11. A suction accumulator as defined in claim 10, and further characterized in that the casing outlet and conduit connections to said inner casing are out of alignment with each other.

12. A suction accumulator as defined in claim 10, and further characterized in that said conduit extends for a distance upwardly within said inner casing, said conduit having an outlet opening provided at the upper end thereof to normally be substantially above the liquid level within said inner casing.

13. A suction accumulator as defined in claim 12, and further characterized in that said outlet in the conduit faces away from the inner casing outlet to thereby prevent ejecting a fluid stream therefrom into the casing outlet.

14. A suction accumulator as defined in claim 13, and further characterized in that said conduit outlet has an elongated slot-like configuration to thereby result in the fluid stream ejected therefrom assuming a fan-like pattern to evenly distribute the pressure of the stream within the inner casing.

15. A suction accumulator as defined in claim 1, and further characterized in that said inlet comprises a tubular member extending into the casing, a fluid guide surface on the inner end of said inlet to direct incoming fluid exiting from the inlet at an angle to the longitudinal axis of the inlet around the inner periphery of the accumulator casing to thereby reduce turbulence within the casing.

16. A suction accumulator as defined in claim 15, and further characterized in that said guide surface is defined by a portion of the inlet wall, said portion of the inlet wall being deformed inwardly into the conduit with the down-stream edge thereof being severed from the main portion of the conduit and bent onto the opposite wall surface of the conduit to thereby provide an inlet at the guide surface.

References Cited
UNITED STATES PATENTS

| | | | |
|---|---|---|---|
| 1,914,994 | 6/1933 | Greenwald | 62—472 |
| 2,953,906 | 9/1960 | Quick | 62—278 |
| 3,012,415 | 12/1961 | La Porte | 62—278 |

MEYER PERLIN, Primary Examiner

U.S. Cl. X.R.
62—471